United States Patent [19]

Le Fur et al.

[11] 4,142,977
[45] Mar. 6, 1979

[54] DEVICE FOR EXTRACTING SLUDGE FROM A CIRCULAR DECANTER

[75] Inventors: Jean Le Fur, Hauts de Seine; Jean Durot, Yvelines, both of France

[73] Assignee: Degremont, Rueil-Malmaison, France

[21] Appl. No.: 808,351

[22] Filed: Jun. 20, 1977

Related U.S. Application Data

[63] Continuation-in-part of Ser. No. 698,605, Jun. 22, 1976, abandoned.

[30] Foreign Application Priority Data

Aug. 12, 1975 [FR] France ............................... 75 25059

[51] Int. Cl.² .............................................. B01D 21/24
[52] U.S. Cl. ................................... 210/519; 210/525; 210/530
[58] Field of Search ............... 210/525, 527, 528, 530, 210/519

[56] References Cited

U.S. PATENT DOCUMENTS

| | | | |
|---|---|---|---|
| 2,223,257 | 11/1940 | Mallory | 210/530 X |
| 2,427,091 | 9/1947 | Durdin | 210/530 |
| 3,348,696 | 10/1967 | Parks et al. | 210/530 |
| 3,494,462 | 2/1970 | Baud | 210/528 X |
| 3,951,819 | 4/1976 | Shaffer et al. | 210/527 |

FOREIGN PATENT DOCUMENTS

| | | | |
|---|---|---|---|
| 2212706 | 9/1973 | Fed. Rep. of Germany | 210/528 |
| 2310198 | 9/1974 | Fed. Rep. of Germany | 210/527 |
| 703182 | 1/1954 | United Kingdom | 210/528 |

Primary Examiner—Morris O. Wolk
Assistant Examiner—Arnold Turk
Attorney, Agent, or Firm—Wenderoth, Lind & Ponack

[57] ABSTRACT

A circular decanter includes a stationary hollow column rotatably supporting a bridge which spans the decanter. A trough is integral with the bridge and rotates therewith, whereby sludge drawn by vacuum from the bottom of the decanter is collected in the trough. A sludge evacuation duct is positioned centrally within the hollow column. That portion of the trough which is closest to the column is formed as a siphon having an upstream branch extending downwardly into the sludge collection chamber of the trough and a downstream branch extending downwardly into the sludge evacuation duct. An electric motor for rotating the bridge, trough and siphon is positioned above the column and includes rotating elements attached to the siphon and non-rotating elements. The power supply cables for the electric motor are led upwardly through the column, the sludge evacuation duct and the downstream branch of the siphon and are enclosed within a stationary casing and tube. The upper end of the tube is attached to the stationary elements of the electric motor. A seal in the form of a tubular member is attached to the siphon and surrounds the tube so that the tube is isolated from sludge passing through the downstream branch of the siphon and the sludge evacuation duct.

7 Claims, 6 Drawing Figures

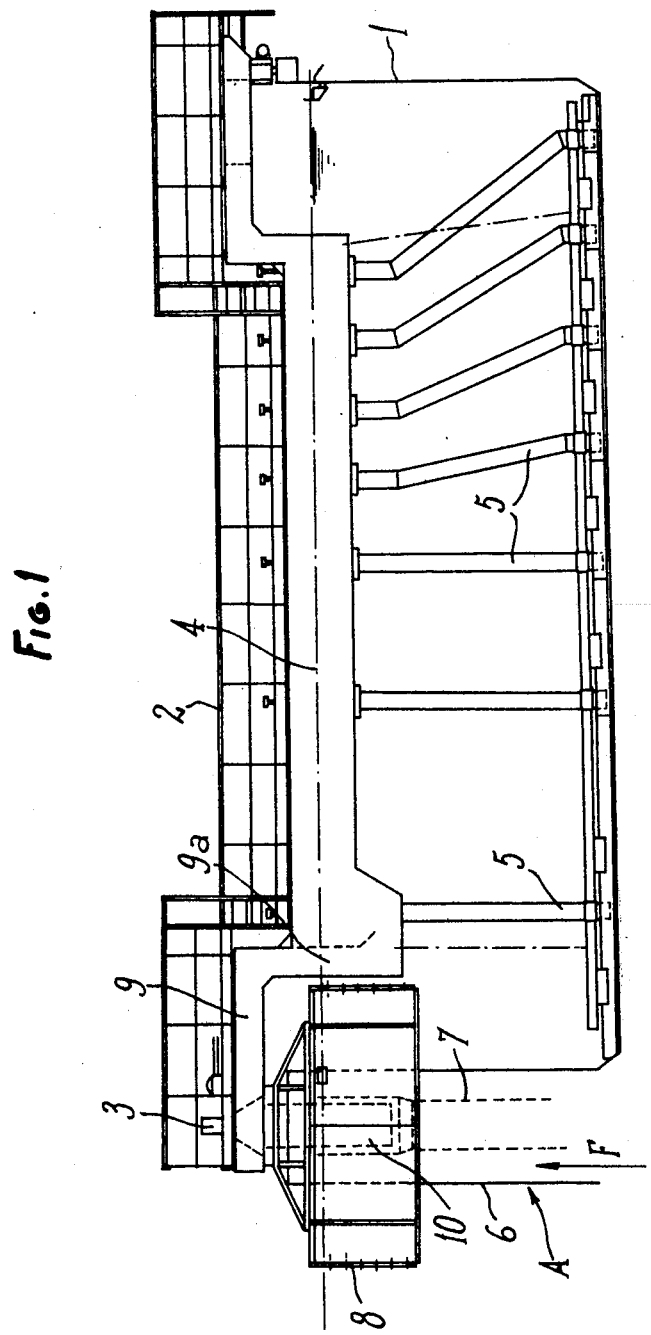

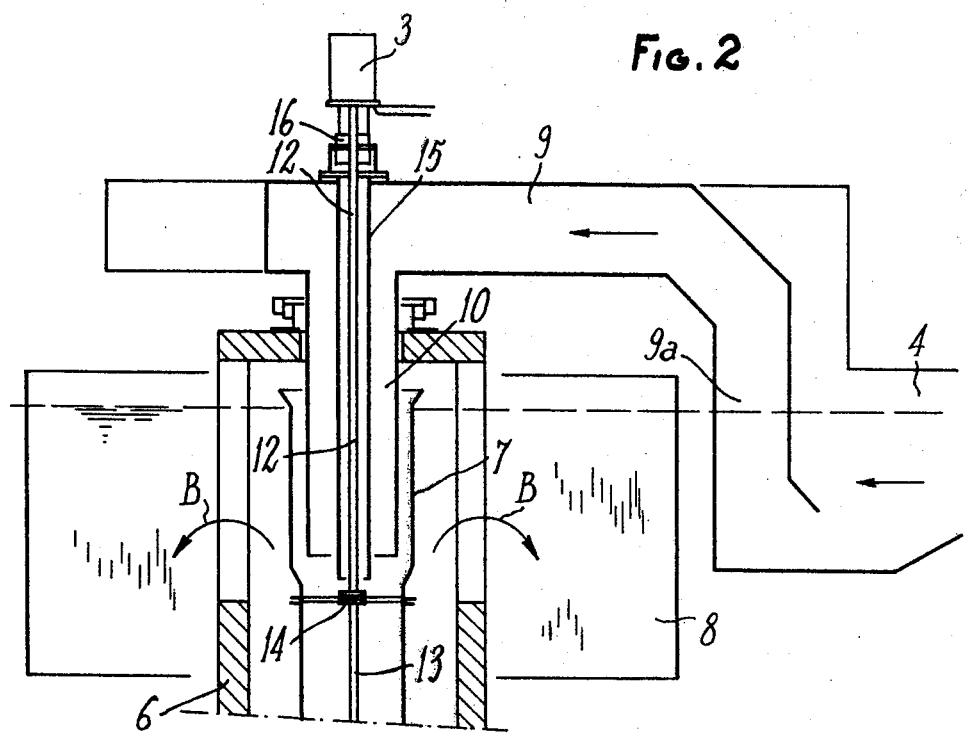
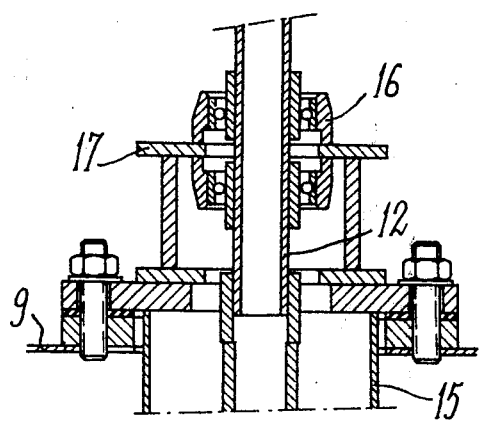
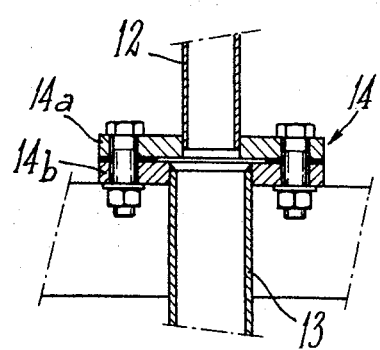

DEVICE FOR EXTRACTING SLUDGE FROM A CIRCULAR DECANTER

This is a continuation-in-part of application Ser. No. 698,605, filed June 22, 1976, now abandoned.

BACKGROUND OF THE INVENTION

The present invention relates to a system for extracting sludge from a circular decanter of the type currently used in liquid treatment plants, and particularly as used in sewage water purification plants. The system of the present invention is particularly applicable to circular decanters of the rotary bridge type, wherein sludge is sucked from the bottom of the tank into a receptacle or trough which is integral with the rotary bridge.

Rotary bridge decanters are known wherein the rotary bridge is supported by a stationary hollow central column, liquid to be treated is supplied through the hollow column to the decanter, a deflector is positioned concentrically around the hollow column for uniformly distributing the liquid to be treated, and sludge to be evacuated from the bottom of the decanter is evacuated through the hollow column.

In known decanters of this type however, certain inherent constructional and operational problems exist. Specifically, in such known decanters it has up to now been difficult to provide for transfer of evacuated sludge from the trough into the central column. Such sludge transfer is normally performed either by the operation of siphons or by simple gravity flow, but in either case difficult construction problems attended by serious limitations in treatment efficiency have been encountered.

The most popular attempt to solve these problems has involved the utilization of a movable siphon attached to the rotary bridge and adapted to direct the sludge into a fixed circular trough adjacent the central hollow column. This sludge is subsequently discharged from this circular trough by overflow. However, the presence of this trough makes it necessary to locate the input deflector for the distribution of the liquid to be treated at a relatively low level in the decanter in order to obtain a desired water flow rate. The liquid to be treated is deaerated only after its passage beneath the deflector, and this detrimentally affects the efficiency of the overall treatment operation which requires a thorough and complete deaeration of the liquid.

Another known arrangement employs a movable annular spout externally adjacent the input deflector, such spout being rigidly attached to the bridge to rotate therewith. The sludge flows from the collecting trough through sludge suction conduits into the movable annular spout, and the sludge is discharged from the annular spout into the central column. It will be apparent that the construction of this type of arrangement is complicated. Furthermore, it has been found to be difficult to properly adjust the rate of suction of the sludge.

Another known system provides for the sludge to flow outwardly from the collecting trough to a movable spout which is fixed to the bridge, the sludge then being discharged by gravity flow into a discharge conduit within the central column. Rotary mechanical seals are necessary to seal the spout to the discharge conduit. The proper adjustment of these seals, particularly due to their inherent large dimensions, is difficult. The provision of such spout also is attended by difficulty in obtaining satisfactory input distribution and deaeration of the liquid to be treated.

In all of the above mentioned known systems, inherent operational problems are due to the apparent necessity of an intermediate movable or fixed annular channel or spout.

SUMMARY OF THE INVENTION

With the above discussion in mind, it is a primary object of the present invention to provide a circular decanter wherein sludge may be evacuated directly to a sludge evacuation duct located within the central hollow column without the need for any intermediate channel or spout, and to thereby eliminate the above discussed disadvantages of prior art systems.

According to the present invention, this object is achieved in that that portion of the sludge collecting trough which is located adjacent the center column is formed as a siphon having a downstream branch extending downwardly into the sludge evacuation duct positioned within the hollow central column.

It is a further object of the present invention to provide an improved arrangement whereby power supply cables for an electric motor positioned above the central hollow column for rotating the bridge may be supplied to the electric motor.

This object is achieved in accordance with the present invention by passing the power supply cables upwardly through the sludge evacuation duct and the downstream branch of the siphon within the central hollow column. The power supply cables are enclosed within a casing and a tube, the upper end of which is fixed to stationary elements of the electric motor. A tubular member has an upper end attached to the rotating siphon and surrounds the tube which encloses the power supply cables.

BRIEF DESCRIPTION OF THE DRAWINGS

Further and other objects, features and advantages of the present invention will be apparent from the following detailed description, taken with the accompanying drawings, wherein:

FIG. 1 is a partial schematic and sectional view of a circular decanter including the improved features according to the present invention;

FIG. 2 is an enlarged sectional and schematic view of the central portion of the improved decanter shown in FIG. 1;

FIGS. 3 and 4 are further enlarged partial sectional views of details of the structure shown in FIG. 2.

DETAILED DESCRIPTION OF THE INVENTION

Figure 5:
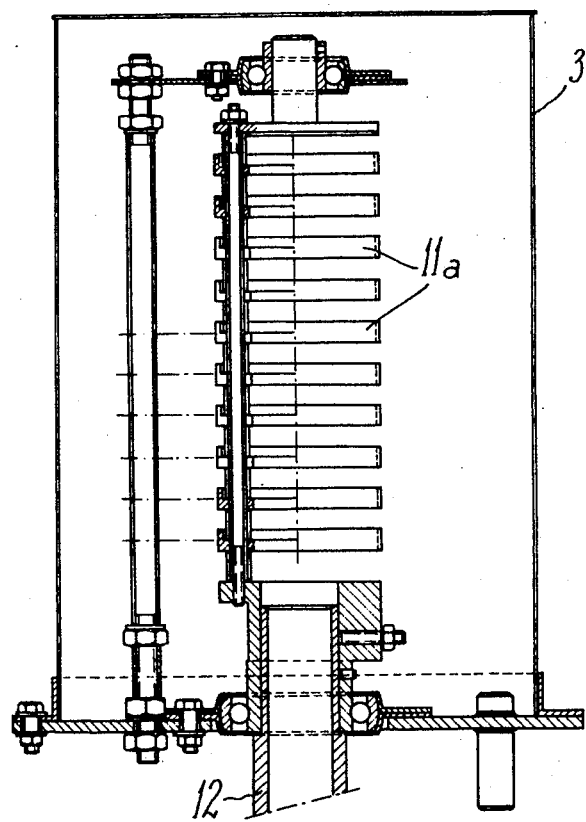
FIGS. 5 and 6 are respectively an enlarged vertical section and an enlarged plan view of the motor assembly for rotating the bridge in the decanter of FIG. 1.

With reference now to FIG. 1, a circular decanter in the form of an enclosure 1 includes a bridge 2 which is supported on and rotated around a hollow central column 6 by means of a motor assembly 3 in a conventional manner. It is specifically to be understood that FIG. 1 shows only a portion of the circular decanter. It is to be further understood that the portions of the circular decanter which are not illustrated and which are not described in detail herein are intended to be conventional and would thus be readily understood and known by those skilled in the art.

The rotating bridge 2 has integrally attached thereto a radially outwardly extending channel or trough 4. The purpose of trough 4, as will be readily understood by those skilled in the art, is to gather sludge from the bottom of the decanter via pipes 5 by the action of suction applied in a conventional manner from a vacuum source (not shown).

As mentioned above, the rotating bridge 2, and thus the sludge gathering trough 4 are supported on hollow central column 6. Liquid to be treated, such as sewage water, is supplied in a conventional manner to the decanter 1 upwardly through hollow central column 6, as shown by arrow F in FIG. 1, and is discharged into the decanter from hollow central column 6 in the manner indicated by arrows B in FIG. 2. A water input deflector 8 is provided adjacent the hollow central column 6 to ensure a uniform distribution of the water to be treated into the decanter.

Hollow central column 6 has coaxially positioned therein a duct 7 for receipt of sludge to be evacuated from the decanter. In accordance with a particularly advantageous feature of the present invention, that portion of trough 4 which is adjacent to hollow central column 6 is arranged in the form of an integral siphon 9 having an upstream branch 9a which extends downwardly into the sludge collecting chamber of trough 4 and having a downstream branch 10 which extends directly into the upper portion of sludge evacuation duct 7. Due to this arrangement, the sludge collected in trough 4 from decanter 1 is evacuated by the action of siphon 9 directly through siphon 9 into the sludge evacuation duct 7 itself. This arrangement completely eliminates the need for any complicated intermediate structure such as a pickup channel or spout between the sludge collecting system and the sludge evacuation duct, as has heretofore been necessary in known circular decanter systems.

The above arrangement also makes possible the provision of a further particularly advantageous arrangement of the present invention. As discussed above, the bridge 2, trough 4 and siphon 9 are rotated about column 6 by motor assembly 3. The use of a motor assembly to drive the rotating bridge and trough of a circular decanter is well known in the art, and it is intended that the scope of the present invention not be limited by the particular type of motor assembly 3 employed. One such motor assembly, and the connection thereof to rotate the bridge, which may be employed in accordance with the present invention is as shown in U.S. Pat. No. 3,348,696. Other conventional motors and connections thereof to the bridge may however be employed in the present invention.

However, a problem which has existed in previous circular decanters is that it has been difficult to lead power cables to the motor assembly without complicated electrical junctions or without the risk of contamination of the power cables by the water to be treated or by the sludge. This problem is overcome in accordance with the unique arrangement of the present invention.

More particularly, in accordance with the present invention the motor assembly 3 is mounted and attached in any conventional and known manner to achieve rotation of bridge 2, trough 4 and siphon 9. It is however possible, due to the provision of downstream branch 10 of siphon 9 extending into sludge evacuation duct 7, to lead the power cables directly to the motor assembly 3 without the necessity of complicated electrical connecting structure or without the danger of shorting out such power cables.

Figure 6:
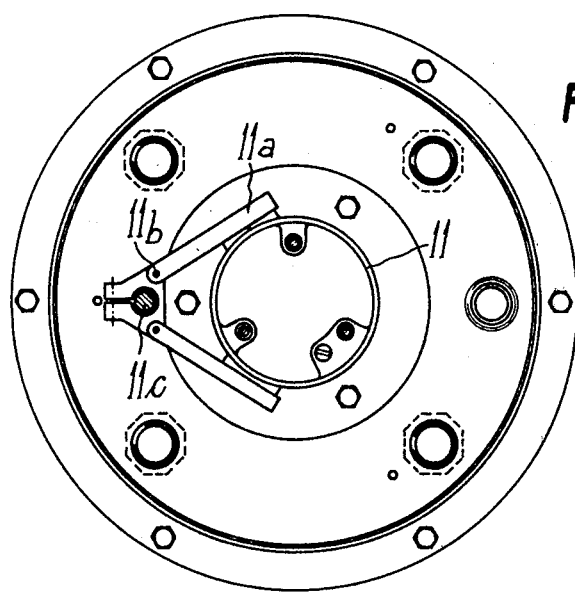

As stated previously, motor assembly 3 may be of any known or conventional type, and may be mounted in any conventional or known manner to achieve rotation of bridge 2, trough 4 and siphon 9. In the specifically illustrated embodiment the motor assembly 3 is intended to illustrate a conventional and commercially available asynchronous three-phase electric motor. As briefly and somewhat schematically illustrated in FIGS. 5 and 6, such a conventional electric motor may include fixed rings 11, and rotating brushes 11a which slide against rings 11 and which are pivoted as at 11b to supports mounted on a rod 11c. The rotating portions of the motor assembly 3 are connected as is conventionally known in the art, e.g. as shown in U.S. Pat. No. 3,348,696, to bridge 2, and in the specifically illustrated embodiment to siphon 9, to thereby achieve rotation of siphon 9, bridge 2 and trough 4.

The electrical feed cables necessary for the operation of motor assembly 3 are not shown in the present drawings, but are passed upwardly through a casing 13 and a tube 12 to the interior of motor assembly 3. Tube 12 and casing 13 do not rotate. Surrounding tube 12 is a tubular member 15 which is fixed to siphon 9 as shown in FIG. 4 and which thus rotates therewith. Thus, the upper end of tubular member 15 is attached to siphon 9 and rotates therewith, whereas tube 12 does not rotate. FIG. 4 shows the manner in which rotation of tubular member 15 with respect to tube 12 is allowed. That is, this rotation is guided by a ball bearing assembly 16 which is mounted on a plate 17 which is attached to siphon 9 and tubular member 15.

Tubular member 15 is longer than downstream branch 10 of siphon 9 and extends therethrough while coaxially surrounding tube 12. The lower end of tubular member 15 is dimensioned to be closely adjacent the exterior of non-rotation tube 12.

Accordingly, it will be apparent that tubular member 15 in effect seals tube 12 from the sludge passing through downstream branch 10 of siphon 9. It will be further apparent that the manner of interconnection of tubular member 15 to siphon 9 and to motor assembly 3 and the manner of interconnection of tube 12 to motor assembly 3 is such as to achieve rotation of tubular member 15 about non-rotating tube 12.

The lower end of tube 12 is connected to casing 13 via a joint 14 formed by flanges 14a and 14b of tube 12 and casing 13, respectively, which are joined by suitable means such as the illustrated bolts and nuts. Joint 14 may be designed, as illustrated in FIG. 2 of the drawings, to center the lower end of tube 12 within the sludge evacuation duct 7.

It is specifically to be understood that the present invention is not intended to be limited to the specific motor assembly or to the manner of connection thereby to the siphon 9. Rather, it is intended that the novel and important concepts of the present invention are the passage of power cables through a fixed tube which is connected to fixed elements of the motor assembly and the provision of a tubular member coaxially surrounding and sealing the tube 12, with the tubular member being suitably connected to the rotating siphon portion of the bridge. Therefore, the specifically illustrated structural arrangements may be varied as necessary to conform to other known motor assembly configurations, while still maintaining the above important critical features.

In accordance with the present invention it is therefore possible to pass the electric power feed cables directly to the motor assembly 3 without the provision of complex and costly electrical connecting structure and without the danger of contaminating the electric power feed cables.

It will be apparent that various modifications may be made to the above specifically described structural arrangements without departing from the scope of the present invention.

What is claimed is:

1. A circular decanter for the decantation treatment of liquid, said decanter comprising:
   an enclosure having a substantially circular configuration and including a bottom;
   a vertically extending stationary hollow column positioned centrally within said enclosure;
   means for introducing liquid to be treated through said column and therefrom into said enclosure, whereby sludge settles from said liquid onto said bottom of said enclosure;
   a bridge element spanning said enclosure from said column to the periphery of said enclosure;
   motor means mounted above said column for rotating said bridge about said column;
   a sludge evacuation duct fixedly positioned coaxially within said column;
   a substantially radially extending sludge collection trough integrally attached to said bridge for rotation therewith and having a chamber for collecting therein sludge drawn by suction from said bottom of said enclosure;
   suction means for drawing sludge from said bottom of said enclosure into said chamber of said trough; and
   the portion of said trough positioned closest to said column being formed as siphon means for withdrawing sludge collected in said chamber and passing such withdrawn sludge directly into said sludge evacuation duct, said siphon means including an upstream branch extending downwardly into said chamber of said trough and an integral downstream branch extending downwardly into said sludge evacuation duct.

2. A decanter as claimed in claim 1, further comprising deflector means coaxially positioned about said column for controlling the passage of said liquid to be treated from said column into said enclosure.

3. A decanter as claimed in claim 1, wherein said motor means comprises an electric motor having rotating elements connected to said siphon means and stationary elements, and further comprising means connected to said stationary motor elements for leading power supply cables through said column and said sludge evacuation duct to said electric motor.

4. A decanter as claimed in claim 3, wherein said cable leading means comprises a fixed casing extending upwardly through the hollow interior of said column and into said sludge evacuation duct, and a tube extending through said sludge evacuation duct and said downstream branch of said siphon, said tube having a lower end sealingly attached to said casing and an upper end attached to said stationary motor elements.

5. A decanter as claimed in claim 4, further comprising sealing means enclosing said tube for isolating said tube from sludge passing through said downstream branch of said siphon and said sludge evacuation duct.

6. A decanter as claimed in claim 5, wherein said sealing means comprises a rotatable tubular member surrounding said tube, said tubular member having an upper end connected to said siphon and a lower end closely adjacent said tube.

7. A decanter as claimed in claim 6, wherein said tubular member extends completely through said downstream branch of said siphon.

* * * * *